Sept. 10, 1957  J. J. VASTANO  2,805,541
LINK FOR EXPANSIBLE BRACELETS HAVING AN
INTERMEDIATE CONNECTOR CARRYING PLATE
Filed Dec. 14, 1954  2 Sheets-Sheet 1
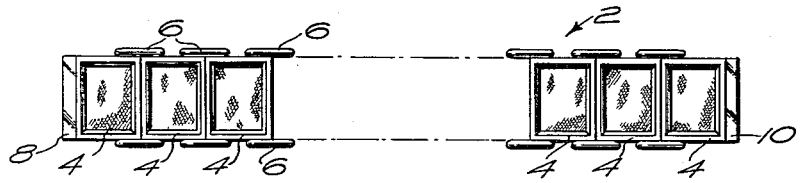
FIG. 1
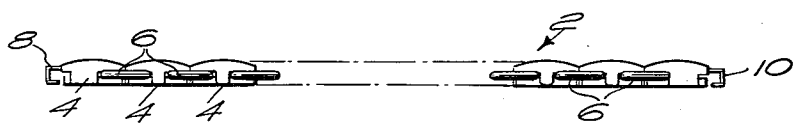
FIG. 2
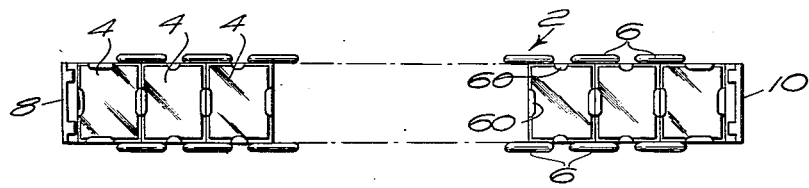
FIG. 3
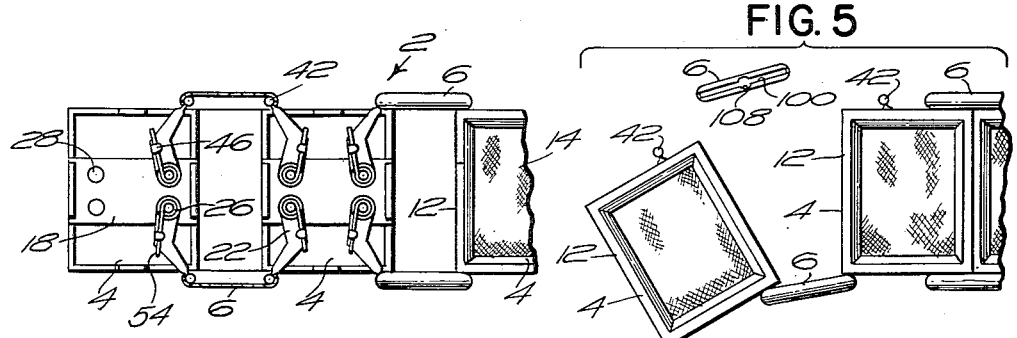
FIG. 4
FIG. 5
*INVENTOR.*
JOSEPH J. VASTANO
BY
ATTORNEY

Sept. 10, 1957 J. J. VASTANO 2,805,541
LINK FOR EXPANSIBLE BRACELETS HAVING AN
INTERMEDIATE CONNECTOR CARRYING PLATE
Filed Dec. 14, 1954 2 Sheets-Sheet 2

*INVENTOR.*
JOSEPH J. VASTANO
*BY*
Maxwell J. Perrotta
ATTORNEY

United States Patent Office 2,805,541
Patented Sept. 10, 1957

2,805,541

LINK FOR EXPANSIBLE BRACELETS HAVING AN INTERMEDIATE CONNECTOR CARRYING PLATE

Joseph J. Vastano, East Providence, R. I., assignor to Flex-Let Corporation, East Providence, R. I., a corporation of Rhode Island Application December 14, 1954, Serial No. 475,111

2 Claims. (Cl. 59—79)

The present invention relates to improvements in expansible chain for bracelets and the like and more particularly has to do with an improved chain construction having substantial flexibility and wherein the length thereof can be varied by improved means providing for separability.

A primary object of the present invention is to provide an expansible chain for bracelets and the like having improved flexibility such that relative movement in almost any direction between the sections of the chain does not create any undue stresses such as cause bending or twisting of any of the component parts.

Another important object of the present invention is to provide an improved expansible chain construction wherein the link sections are joined by means providing for separability so as to selectively vary the chain length.

A further object of the present invention is to provide an improved construction wherein it is possible to use decorative shells of unusual shape and materials heretofore not possible with such arrangements as crossed links or telescoping links.

A still further object of the present invention is to provide an improved expansible chain construction wherein the mechanical parts are housed within shells one surface of one of which is substantially smooth so as to be particularly suitable for wearing about one's wrist and the construction of the shells being such as to predeterminately space the link, link arms and resilient means from the shells, for unimpaired functioning from their expanded position to their contracted position and vice versa.

Another object of the present invention is to provide an improved expansible chain for bracelets and the like wherein the plural link sections have pivotal link arms extending therefrom and connecting means is provided for interconnecting adjacent link arms with maximum flexibility.

Still another object of the present invention is to provide an improved expansible chain according to the preceding object and wherein the connecting means is of simple construction, light in weight and yet provides for facile separation of the link arms associated therewith.

Other objects are to provide an improved expansible chain construction which is of overall simple construction, requiring only simple forming and assembling operations, and which utilizes a minimum of stock so as to result in a light weight and inexpensive construction.

Various other objects and advantages will become apparent from the detailed description to follow.

In the drawings:

Figure 1 is a top plan view showing an expansion chain for a bracelet embodying my invention;

Figure 2 is a side elevational view of the chain of Figure 1;

Figure 3 is a bottom plan view of the chain of Figure 1;

Figure 4 is an enlarged view of a portion of the chain of Figure 1, parts being removed to show the inner arrangement of mechanical elements when in their expanded relationship;

Figure 5 is a view similar to Figure 4 but showing the manner in which separability is effected;

Referring more particularly to the drawings wherein like numerals apply to like parts throughout, and looking now at Figures 1-3, it will be seen that I have provided a bracelet 2 constructed from an expansible chain in accordance with the present invention which is comprised of a plurality of link sections 4 joined by the connecting means 6 and provided with terminal links 8 and 10.

Figure 8:
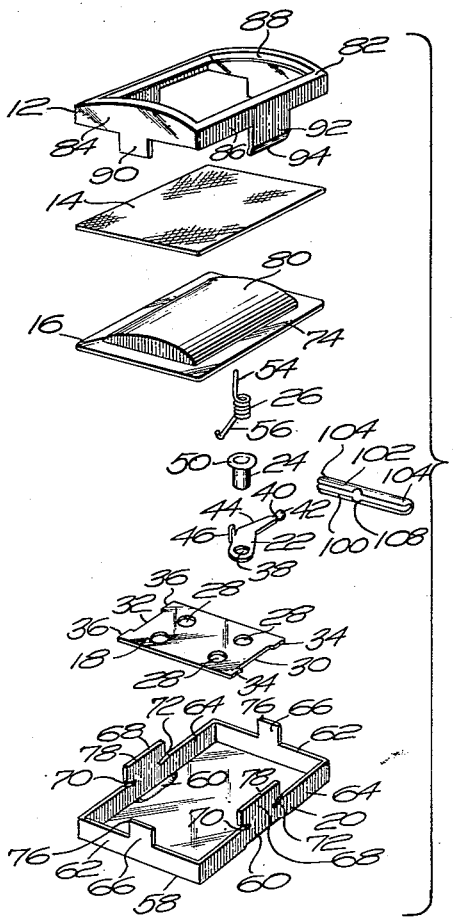
Figure 8 is an exploded perspective view of one of the link sections showing the various component parts.

Having reference to Figure 8, there is shown a link section 4 enlarged and in exploded perspective view to illustrate the component parts. The link section 4 is comprised of a top half shell 12, decorative leather insert 14, liner 16, link 18 and bottom half shell 20. With each link 18 there is provided four link arms 22, rivets 24 and springs 26 although only one of each is shown for clarity.

As shown the link 18 is a stamped substantially rectangular blank having four openings 28 punched therethrough, two at each end portion. The end edges 30 and 32 each have a pair of flanges or small extensions 34 or 36 extending therefrom for a purpose to be described in detail hereinafter.

Each link arm 22 is comprised of an elongated substantially flat narrow stamping tapering from a hub 38 to a reduced cross-sectional portion at 40 which joins the ball-like terminal formation 42 to the main portion of the arm 22. Along one side edge 44 of the link arm is provided a spring tab or tongue 46 which is adapted to be bent over a spring end as will be seen. The hub 38 is provided with an opening 48 corresponding in size with the link openings 28. Two of the link arms are identical with the one link arm shown and the other two are mirror reflected forms of these link arms.

Figure 7:
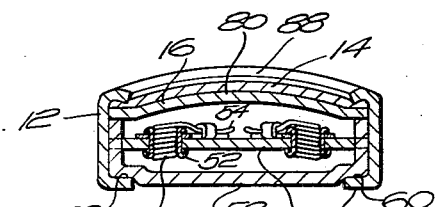
Figure 7 is a vertical sectional view taken substantially along the plane of line 7—7 of Figure 6.

In order to pivotally connect the several link arms 22 with the link 18 a plurality of hollow rivets 24 flanged at 50 are provided for insertion through the aligned openings of the link arms and links after which the end of the rivet 24 remote from the flanged end 50 is deformed to provide a similar flange at 52, see Figure 7.

Through each hollow rivet 24 a resilient means in the form of a coil spring 26 is passed, one end 54 of the spring being engaged against the spring tab 46 which is bent over the same to tie the link arm to the spring. The other end 56 of the spring has a bent end which is engaged in the adjoining hollow rivet at the same end of the link, as shown best in Figure 6. Of course, the end 56 could alternatively be engaged against a spring tab struck from the link, if desired, or any other suitable anchoring means can be provided for that end of the spring.

The bottom half shell 20 is formed from a stamping so as to have a substantially smooth bottom surface 58 interrupted only by the indented portions at 60, see also Figures 3 and 7. Upstanding walls 62 and 64 extend from the side and end edges of the bottom and each of the upstanding walls has a flange extension 66 or 68, extending therefrom. The flanges 68 are undercut at 70 and 72 so as to provide opposing shoulders between which the flanges 34 and 36 of the link 18 are received for support of the link on the bottom half shell.

The liner 16 which is also formed from a stamping is comprised of a flat peripheral portion 74 which is adapted to rest on the upper edges 75 and 78 of the flanges 66 and 68 of the bottom half shell, and a curved central portion 80 which provides a backing for the leather insert 14 which rests thereon.

The top half shell is also formed from a stamping and is provided with a top surface 82, in the form of a frame for the leather insert 14, and depending side walls 84 and 86 which are spaced sufficiently far apart to receive at least the flanges 66 and 68 therein, the latter abutting the liner 16 against the inside of the top surface of the top half shell so as to hold the decorative leather insert in position relative to the opening 88. The depending flanges 90 and 92, which extend from the side walls 84 and 86, embrace the upstanding walls 62 and 64 and at least the flanges 92 have their end edge portions 94 inwardly bent to engage in the indented portions 60 of the bottom half shell so as to complete the assembly of one section. Inasmuch as all the link sections are alike, a description of one suffices for all.

Figure 9:
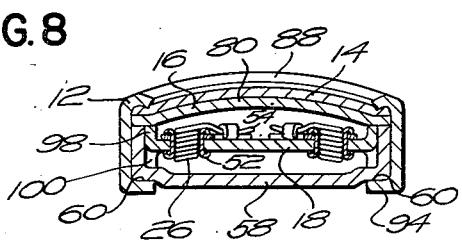
Figure 9 is a view like Figure 7 but showing a slightly modified form of link.
Figure 10:
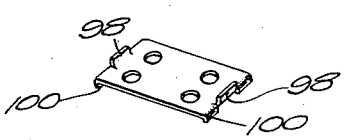
Figure 10 is a detail perspective view of the modified link per se of Figure 9.

In Figures 9 and 10 a slightly modified form of link 96 is shown. Instead of utilizing the flanges 34 and 36 and the shoulders at the cut-aways 72, the link 96 has upturned and downturned flanges 98 and 100 which support the link 96 and the elements associated therewith in predetermined relation to the top and bottom half shells. With the latter arrangement the flanges 68 become unnecessary. In order to couple adjacent link sections connecting means are provided in the form of connecting bars 102. Each connecting bar is of sleeve-like form and has socket-like end formations 104 adapted to receive the ball-like end formations 42 therein. The slot 106 extends from the socket-like end formations and is sufficiently large to slidably receive the reduced portion 40 of the link arms but is small enough to retain the ball-like end therein. The slot 106 merges with an enlarged opening 108 remote from the socket-like end formations and large enough to pass the ball-like end formations therethrough.

Figure 6:
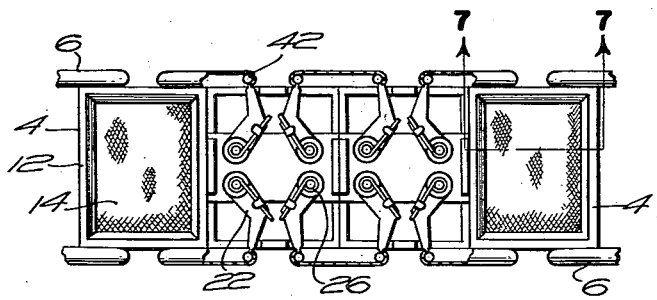
Figure 6 is a view similar to Figure 4 but with the arrangement in their contracted relationship.

The link arms 22 are free to move in the slots formed between the juxtaposed edges of the top and bottom half shells and the connecting bars interconnect the projecting link arm ends for movement of the link sections from the contracted position of Figure 6, to the expanded position of Figure 4. When it is desired to remove or add one or more link sections this is easily accomplished as shown in Figure 5 wherein one of the link arms 22 is being disengaged from the connecting bar 102.

It is to be realized that although only one form of decorative insert is shown and only rectangular shells are illustrated, such can be varied as desired and as matters of design. Moreover although all the connecting bars are shown as being of the separable construction, that feature can be limited to only certain of the connecting bars although it is preferred that the connecting bars be similar. Also it will be understood that the link arms and connecting bars can either be provided with ball-like or socket-like formations.

The number of link arms can be varied and if desired a common pivot can be utilized for at least a pair of link arms.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

I claim:

1. An expansion chain comprising a plurality of links disposed in end to end serial relation, each of said links including top and bottom half shells, the bottom shell including a main body portion having upstanding peripheral walls with both the end and side walls having upwardly extending substantially medially disposed flanges, the top shell including a main body portion having depending peripheral walls with both the end and side walls having downwardly extending substantially medially disposed flanges, a link plate having its opposite ends notched and straddling the flanges on opposite side walls of said bottom shells, the flanges on said bottom shell being nested within said top shell and having their upper edges bottoming within said top shell to maintain the edges of the upstanding and depending walls of the bottom and top shells in spaced relation defining elongate slots separated by the widths of said flanges, the flanges of said top shell embracing the flanges of the bottom shell and underlying portions of the upstanding walls to secure the two shells together, and there being two pairs of elongate link arms, each link arm having its inner end pivotally mounted on said link plate and the link arms of each pair extending in opposite directions to project laterally outwardly of said shells through said slots, with the pivotal mounting of each link arm being such as to permit its outer free end to move back and forth longitudinally of the link, resilient means normally urging the outer ends of those link arms on the same side of the link toward each other, and connecting bars interconnecting the outer ends of adjacent link arms of adjacent links.

2. An expansion chain according to claim 1 wherein at least certain of said connecting bars include means providing for separability of the link arms interconnected thereby.

References Cited in the file of this patent

UNITED STATES PATENTS

| 375,629 | Heidmann | Dec. 27, 1887 |
| 728,741 | Mason | May 19, 1903 |
| 1,103,760 | Goodridge | July 14, 1914 |
| 1,701,610 | Forstner | Feb. 12, 1929 |
| 1,833,013 | Anderson | Nov. 24, 1931 |
| 2,249,086 | MacIntosh | July 15, 1941 |
| 2,267,968 | Augenstein | Dec. 30, 1941 |
| 2,315,417 | Greenberg | Mar. 30, 1943 |
| 2,677,230 | Pinson | May 4, 1954 |
| 2,689,450 | Stiegele | Sept. 21, 1954 |
| 2,690,049 | Pinson | Sept. 28, 1954 |

FOREIGN PATENTS

| 628,966 | France | July 12, 1927 |